No. 674,655. Patented May 21, 1901.
J. PATRICK.
NON-SLIPPING HORSESHOE.
(Application filed Nov. 8, 1900.)

(No Model.)

Witnesses
Edward T. Wray.
Homer L. Kraft.

Inventor
John Patrick
by Parker & Carter
his Att'ys.

THE NORRIS PETERS CO., PHOTO-LITHO., WASHINGTON, D. C.

UNITED STATES PATENT OFFICE.

JOHN PATRICK, OF CHICAGO, ILLINOIS.

NON-SLIPPING HORSESHOE.

SPECIFICATION forming part of Letters Patent No. 674,655, dated May 21, 1901.

Application filed November 8, 1900. Serial No. 35,795. (No model.)

*To all whom it may concern:*

Be it known that I, JOHN PATRICK, a citizen of the United States, residing at Chicago, in the county of Cook and State of Illinois, have invented a certain new and useful Improvement in Non-Slipping Horseshoes, of which the following is a specification.

My invention relates to horseshoes, and has for its object to provide a new and improved horseshoe, of which the following is a description, reference being had to the accompanying drawings, wherein—

Figure 1:
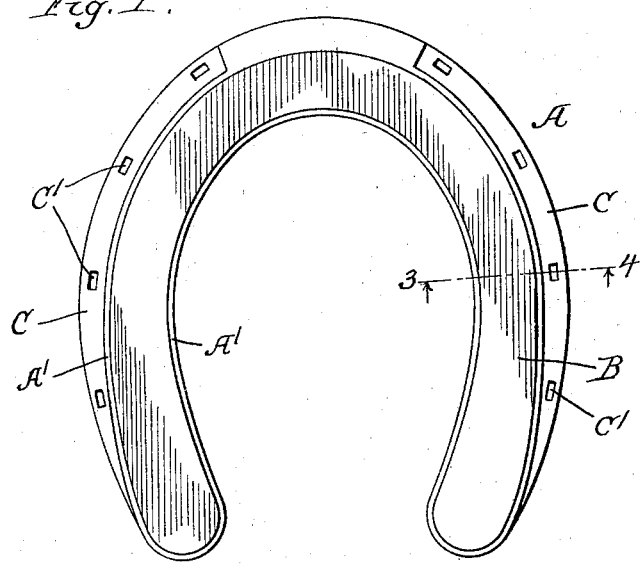
Figure 2:
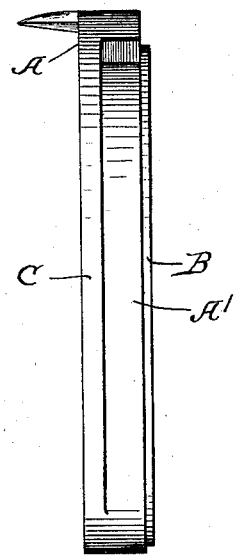
Figure 5:
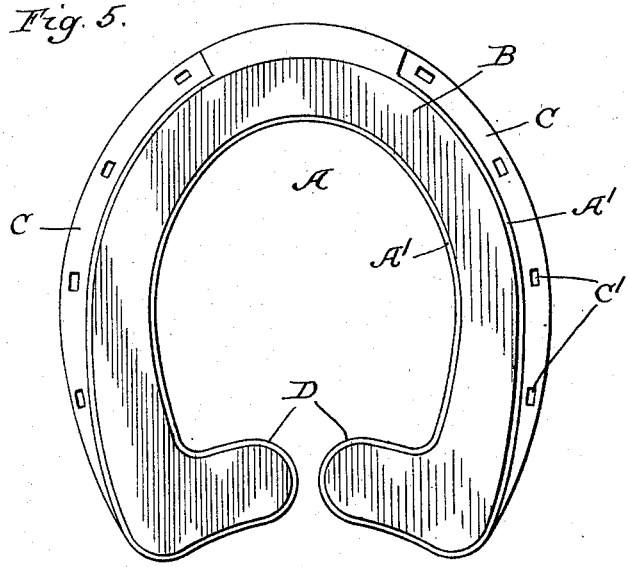
Figure 3:
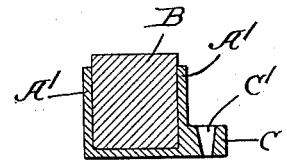
Figure 4:
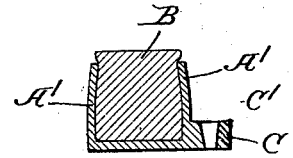

Figure 1 is a view as seen from below of a horseshoe embodying my invention. Fig. 2 is a side view of the device shown in Fig. 1. Fig. 3 is a section on line 3 4, Fig. 1. Fig. 4 is a section on line 3 4, Fig. 1, after the sides of the shoe have been compressed, so as to hold the filling in position. Fig. 5 is a view as seen from below, showing the shoe supplied with frog-pressure parts.

Like letters refer to like parts throughout the several figures.

One of the objects of my invention is to provide a non-slipping elastic-tread horseshoe which will be efficient and durable.

In carrying out my invention I provide a metallic part A, formed with the desired shape and provided with downwardly-projecting flanges A', preferably extending entirely around the outer and inner edges of the shoe, as shown. I insert between the flanges—that is, in the groove formed by the flanges—some suitable non-slipping or elastic material B, which projects beyond the flanges, so as to engage the surface over which the horse is traveling. Any desired material may be used, such as rubber, rawhide, or a series of layers of rubber and cloth or ducking and the like. The flanges are preferably parallel to each other, although their upper edges may be slightly bent outwardly, if desired, so that the material to be placed in the groove between the flanges can be easily inserted. The material is cut of the proper shape and is then inserted in the space between the flanges, as shown in Fig. 3. The flanges are then bent inwardly at their upper ends sufficiently to tightly grasp the material and fasten it in position. (See Fig. 4.)

It will thus be seen that I have here a metallic part provided with projecting flanges adapted to be varied in position after the material is placed between them, so as to engage the material and fasten it in position. The metal part of this shoe may be made of soft steel and may be drop-forged. This metallic part of the shoe is provided with the laterally-projecting part C, having the nail-holes C', through which the nails are driven which fasten the shoe to the horse's foot. The material B is permitted to project a sufficient amount beyond the flanges A' to insure the proper results, and the flanges are preferably made thin enough so that they will wear away as the material is worn away by the use of the shoe, so that a portion of the material will always be exposed and the desired effect obtained. The space or groove between the flanges is preferably wider near the heels than at the front part, so that more material can be used at these points. In many instances it is desirable to provide the shoe with parts which press upon the frog on the horse's foot, thus relieving the weight from the edges of the hoof. In Fig. 5 I have shown a construction for this purpose, the heels of the shoe being provided with frog-pressure parts D, which extend inwardly. These frog-pressure parts are provided with the groove and the flanges, so that the non-slipping or elastic material may be fastened to them. This construction provides a shoe of great efficiency and long life, the shoe being efficient throughout its life.

Since the parts are arranged so that the material B projects beyond the flanges and the edges of the flanges wear away in proportion to the wearing of the material, it will be seen that this material at all times engages the surface over which the horse is traveling and acts to hold the shoe against slipping. The frog-pressure parts being also provided with non-slipping material and projecting laterally from the body of the shoe increase its holding capacity and render slipping less liable than when the construction shown in Fig. 1 is used.

I have shown in detail a construction embodying my invention; but it is of course evident that some of the parts may be varied in certain particulars, and I therefore do not limit myself to the exact construction shown.

The shoe herein described is drop-forged, and the construction shown permits the manufacture in this way. It will be noted that, as shown in Fig. 3, for example, the space between the flanges A' when the shoe is made is not dovetail and the flanges do not when they come from the shop have any tendency to hold the non-slipping material in place. It will also be noted that this non-slipping material has substantially parallel sides before being inserted between the flanges. The flanges themselves are then bent inwardly, so as to distort the non-slipping material, as shown in Fig. 4. It is not simply the upper edges of these flanges that are bent, but the entire flange is preferably bent, so that as the parts wear away the non-slipping material will still be held in position.

I claim—

1. A horseshoe, comprising a metallic part provided with thin downwardly-projecting flanges normally separated and having smooth continuous outer edges, a non-slipping or elastic piece inserted between said flanges and projecting beyond them, said flanges adapted to both be moved toward the piece so as to grip it substantially along their entire length, the parts being thus engaged by the flanges so as to be held in position, the parts so arranged that the edges of the flanges wear away when the shoe is used so that the non-slipping or elastic material at all times projects beyond them.

2. A horseshoe, comprising a metallic part, provided with downwardly-projecting flanges normally separated so as to form a groove, both of said flanges free to move with relation to the body of the shoe, a non-slipping or elastic piece normally having parallel sides and inserted between said flanges, both of said flanges being inclined bodily toward the material so as to grip and distort it and hold it in position, two laterally-projecting parts at the end of the shoe projecting toward each other, but separated by a space so as to have free ends, and provided with flanges which are continuous with the flanges of the remaining portion of the shoe, said non-slipping material being contained within the flanges of the projections, substantially as described.

3. A horseshoe, comprising a metallic part provided with thin downwardly-projecting flanges having substantially continuous smooth wearing-surfaces and adapted to be varied in position and having a normally free and open groove or space between them, the flanges being more widely separated toward the heel than toward the front of the shoe, a piece of non-slipping or elastic material inserted between these flanges, said flanges bent inwardly so as to grasp said material and fasten it to the metallic part, said non-slipping material being made wider near the heels of the shoe, so as to completely fill the wider space between the flanges, the flanges engaging the non-slipping material substantially along their entire face, so that the wearing-surface can wear away without releasing said non-slipping material, the shoe so constructed that the wearing-surfaces of metal wear away in such a manner that the non-slipping material always projects therefrom, substantially as described.

4. A horseshoe, comprising a metallic part provided with downwardly-projecting flanges adapted to be varied in position and having a normally free and open groove or space between them, a piece of non-slipping or elastic material inserted between these flanges, said flanges bent inwardly so as to grasp said material and fasten it to the metallic part, said shoe provided at its heels with inwardly-projecting frog-pressure parts, said inwardly-projecting parts being disconnected from each other and separated by a space so that the ends are free, the frog-pressure parts provided with flanges which are continuous with the flanges of the remaining portion of the shoe and having grooves filled with non-slipping material continuous with the other non-slipping material of the shoe, substantially as described.

JOHN PATRICK.

Witnesses:
DONALD M. CARTER,
HOMER L. KRAFT.